United States Patent Office 3,131,084
Patented Apr. 28, 1964

3,131,084
SPRAY COATING AN AIR FILTER WITH NONYL PHENOXY POLYOXYETHYLENE ETHANOL
Robert J. Boylan, Jeffersonville, Ind., assignor to American Air Filter Company, Inc., Louisville, Ky., a corporation of Delaware
No Drawing. Filed Jan. 19, 1961, Ser. No. 83,643
3 Claims. (Cl. 117—104)

This invention relates to ventilating air filters and particularly to reusable filter media employing a water soluble viscous coating agent thereon.

Atmospheric dust filters of the unit permanent viscous impingement type are a well known category of ventilating air filter and pluralities of such units are arranged in banks in the usual installation thereof. Conventionally, such type filter units include a comparatively thick low resistance filter medium formed of relatively endurable material, usually metal, arranged to provide a multiplicity of tortuous air passages therethrough and a viscous tacky surface coating thereon that functions to retain particulate matter that impinges thereagainst during air passage through the unit. Numerous viscous coating materials are well known to the art. Such materials desirably have, in addition to good dust catching and retention properties, a relatively constant viscosity over the temperature range encountered during prospective use thereof to minimize coating migration and a high flash point and nonsmoking characteristics to comply with fire underwriters' standards and requirements. Additionally, such coating materials desirably should be nontoxic, noncorrosive, chemically stable, substantially odor-free and nonhygroscopic.

The enduring character of the filter medium in such type units permits reuse thereof through a reconditioning operation conventionally effected by removal of the viscous coating and the solid particulate matter retained thereon from the medium surface followed by a recoating of the clean medium surfaces with fresh viscous material. Such reconditioning operations, due to the limited water solubility of conventionally employed viscous coating materials having most, if not all of the above enumerated desirable properties, commonly petroleum base materials or tricresyl phosphate mixtures, require removal of the dirty unit from the air stream and insertion of an auxiliary unit in its place, repeated immersions thereof in a cleaning bath, drying of the cleaned unit, a recoating thereof of fresh viscous material and after suitable draining to remove excess coating material, a reinstallation of the unit in the air stream. Apart from the inherently messy and distasteful nature of such reconditioning operations, which continually present the hazard of improper or inadequate cleaning, the time required for such operations, often 24 hours or more, and the labor and material costs attendant therewith add unduly to the operational cost of filter systems using such type units.

This invention may be briefly described as an improved atmospheric dust filter formed of permanent viscous impingement type filter media and a water soluble viscous coating material therefor and which in its broader aspects, also includes a novel method of effecting the reconditioning of such permanent filter media.

Among the advantages of the herein described invention is the provision of an improved unit permanent viscous impingement type of ventilating air filter in which filter medium reconditioning can be simply and inexpensively effected and which permits minimization, if not actual avoidance, of the distasteful and expensive characteristics of present day reconditioning techniques. A further advantage of the subject invention is the permitted reconditioning of permanent viscous impingement type filter media by mere subjection thereof to a stream of running water for a short period of time to remove the dirt containing viscous coating therefrom and by the spray coating of fresh viscous material on the cleaned surfaces thereof.

The primary object of this invention is the provision of an improved permanent viscous impingement type unit filter incorporating a filter medium of an enduring character and a water soluble viscous surface coating therefor.

Another object of this invention is the provision of an improved method of conditioning and reconditioning permanent viscous impingement type filter media.

Other objects and advantages of the invention will be apparent from the following portions of the specification which, pursuant to the requirements of the patent statutes, include a detailed description of the best mode presently contemplated by the inventor for carrying out his invention.

The present invention comprises a ventilating air filter of the permanent viscous impingement type having a relatively thick porous filter medium of enduring character arranged to provide a plurality of tortuous air passages therethrough and having a surface coating thereon of viscous tacky material comprising a nonionic nonyl phenol ethylene oxide condensate. Various types of permanent viscous impingement type filter media of enduring character are well known to the art and may suitably comprise a plurality of metal laminae built up of plates, grids, wires or screens arranged in depth to provide the desired plurality of tortuous air passages therethrough. The desired coating material is specifically a nonyl phenoxy polyoxyethylene ethanol having the following formulation

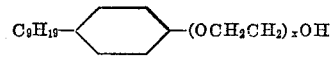

where $x$ is the average number of moles of ethylene oxide and having a practical range of from 9 to 10 with value of 9.5 being preferred.

The above specified coating material has satisfactory dust catching and retention properties and is an odorless, viscous, water clear, nonionic liquid having minimal hygroscopic properties, being somewhat less than 8% at 100% relative humidity and less than 6% at 55% relative humidity. Its flash point is about 535° F., well above any operating temperature normally encountered in filter unit installations of this type and its viscosity is sufficiently high to prevent deleterious migration thereof on the media surface within the ranges of temperatures normally encountered in filter usage.

Apart from the above desirable properties for a filter medium adhesive coating that are possessed by the subject material, it is completely miscible and soluble in cold water which permits filter media reconditioning to be simply and rapidly effected by mere exposure of the dirty media to a stream of running water, as illustrated in the following examples:

*Example I*

An American Air Filter Company, Inc., AL–2 filter having four layers of expanded aluminum as a filter medium was spray coated on both sides with 91.3 grams of 100% active nonyl phenoxy polyoxyethylene ethanol as specified above and the unit as so treated had an initial resistance of 0.147″ water at 800 c.f.m. After fifteen days exposure to an air stream bearing contaminating particulate matter, the filter became quite dirty and its resistance rose to 0.162″ water at 800 c.f.m. At such time the liquid viscous coating was still moist. The filter was then removed from the air stream and washed in a stream of cold tap water from a hose without a nozzle. Cleaning was effected by about two minutes exposure to said stream of cold running tap water at which time the filter resistance was tested and found to be the same as that originally measured.

*Example II*

An American Air Filter Company, Inc., AL-2 filter having three layers of expanded aluminum as a filter medium was spray coated on both sides with 42 grams of 100% active nonyl phenoxy polyoxyethylene ethanol as specified above and the unit as so treated had an initial resistance of 0.110″ water at 800 c.f.m. After forty days exposure to an air stream bearing contaminating particulate matter, the initial resistance of the filter was 0.110″ water at 800 c.f.m. and its final resistance was 0.132″ water at 800 c.f.m. Upon removal from the air stream, the filter was quite dirty and was again exposed to a stream of cold running tap water. In about two minutes, the dirty filter was washed clean and its resistance was the same as the original measured resistance set forth above.

The subject viscous coating material is particularly adapted to be sprayed onto the filter media surfaces and minimal quantites thereof provide extremely satisfactory results. The following tabulation illustrates generally suitable quantites of such sprayed material for various thicknesses of 20 x 20 permanent viscous impingement type filter panels:

| Filter medium thickness: | Quality of material, oz. |
|---|---|
| 2″ | 2½ to 3 |
| 1″ | 1½ to 2 |
| ½″ | 1 |

For industrial use, wherein pluralities of filter panels require relatively frequent reconditioning, a spray gun or portable pressure sprayer, such as Hudson Model 291C, can readily be used to effect application of the coating material on to the filter media surfaces. For home use and for small commercial installations the subject material is readily dispensable from small aerosol containers. In order to effect dispensation of the subject coating material from aerosol containers, however, it is necessary to dilute it with a suitable noninflammable, low viscosity and highly volatile material. I have found that dichloromethane, preferably about 6 parts thereof to 8 parts of nonyl phenoxy polyoxyethylene ethanol as specified above, provides a suitable dilutant in conjunction with carbon dioxide as the propellant that permits aerosol spray type of application, with rapid evaporation of the dilutant after application thereof to form a satisfactory viscous coating of the subject material on the media surfaces.

The above described properties of the specified viscous coating agent permit rapid cleaning of dirtied filter media by mere exposure of the dirtied media to a stream of cold tap water and at least an equally rapid recoating of the cleaned media by a spray application of minimal quantities of the specified fresh viscous coating material. As such, the difficulties and normally distasteful operations attendant required present day reconditioning operations are greatly minimized, if not actually avoided.

Having thus described my invention, I claim:

1. An air filter comprising a filter medium of enduring character arranged to provide a plurality of tortuous air passages therethrough and carrying on the air impinging surfaces thereof a viscous coating consisting of a nonyl phenoxy polyoxyethylene ethanol having substantially from 9 to 10 moles of ethylene oxide per mole thereof.

2. An air filter comprising a filter medium of enduring character arranged to provide a plurality of tortuous air passages therethrough and carrying on the air impinging surfaces thereof a viscous coating consisting of nonyl phenoxy polyoxyethylene ethanol having substantially 9.5 moles of ethylene oxide per mole thereof.

3. In the conditioning of filter media the step of spray coating the media surfaces with a dispersion consisting of nonyl phenoxy polyoxyethylene ethanol having from 9 to 10 moles of ethylene oxide per mole thereof.

References Cited in the file of this patent

UNITED STATES PATENTS

| 2,620,044 | Fine et al. | Dec. 2, 1952 |
| 2,766,072 | Commarato | Oct. 9, 1956 |
| 2,789,093 | Foehr | Apr. 16, 1957 |

FOREIGN PATENTS

| 822,855 | Great Britain | Nov. 4, 1959 |